United States Patent
Triller (10) Patent No.: US 8,123,646 B2
(45) Date of Patent: Feb. 28, 2012

(54) VEHICLE TRANSMISSION WITH CONTINUOUSLY VARIABLE TRANSMISSION RATIO

(75) Inventor: Andreas Triller, Bühl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 845 days.

(21) Appl. No.: 12/215,038

(22) Filed: Jun. 23, 2008

(65) Prior Publication Data

US 2009/0017959 A1 Jan. 15, 2009

Related U.S. Application Data

(60) Provisional application No. 60/936,540, filed on Jun. 21, 2007, provisional application No. 60/967,450, filed on Sep. 5, 2007, provisional application No. 60/999,964, filed on Oct. 23, 2007.

(30) Foreign Application Priority Data

Aug. 3, 2007 (DE) .................. 10 2007 036 826

(51) Int. Cl.
*F16H 37/02* (2006.01)
(52) U.S. Cl. .................. 475/211; 475/212; 475/213
(58) Field of Classification Search .................. 475/210, 475/211, 212, 213
See application file for complete search history.

(56) References Cited

U.S. PATENT DOCUMENTS

| | | | | |
|---|---|---|---|---|
| 5,188,007 A * | 2/1993 | Hattori et al. | ................. | 474/28 |
| 6,986,725 B2 * | 1/2006 | Morscheck | ................. | 475/210 |
| 7,637,836 B2 * | 12/2009 | Watanabe et al. | ............. | 475/210 |
| 7,670,244 B2 * | 3/2010 | Shioiri et al. | ................. | 475/210 |
| 7,815,537 B2 * | 10/2010 | Triller et al. | ................. | 475/210 |

FOREIGN PATENT DOCUMENTS

| | | |
|---|---|---|
| DE | 33 44 042 A1 | 6/1985 |
| DE | 41 19 291 A1 | 12/1992 |
| DE | 196 31 294 A1 | 2/1997 |
| DE | 196 31 072 A1 | 2/1998 |
| EP | 0 141 605 A1 | 5/1985 |
| EP | 0 210 053 A1 | 1/1987 |
| EP | 0 431 771 A1 | 6/1991 |
| FR | 2 303 206 A | 10/1976 |
| JP | 07293663 A | 11/1995 |

* cited by examiner

*Primary Examiner* — Ha D. Ho
(74) *Attorney, Agent, or Firm* — Alfred J. Mangels

(57) ABSTRACT

A first embodiment of a vehicle transmission with continuously variable transmission ratio contains a CVT variator with two variator shafts, an input shaft that can optionally be brought into rotational engagement with one or the other of the variator shafts, and an output shaft that can optionally be brought into rotational engagement with one or the other of the variator shafts, such that two forward driving ranges with opposite torque transmission directions of the CVT variator are present, whose transmission ratio ranges are constantly contiguous with each other.

6 Claims, 8 Drawing Sheets

VEHICLE TRANSMISSION WITH CONTINUOUSLY VARIABLE TRANSMISSION RATIO

BACKGROUND OF THE INVENTION

1. Field of the Invention

The invention relates to a vehicle transmission with continuously variable transmission ratio and a CVT variator (variator with continuously variable transmission ratio), whose spread range is traversed in two constantly contiguous transmission ratio ranges in opposite directions during continuous variation of the transmission ratio.

2. Description of the Related Art

Transmissions of the design described above are also known as $I^2$ transmissions, where I indicates the transmission ratio of the variator and the 2 indicates that the transmission ratio range of the variator is traversed twice.

The object of the invention is to create such an $I^2$ transmission that enables a high drive torque and wide spread while being compactly constructed.

Solutions to this problem are achieved with vehicle transmissions as are described below in the form of advantageous embodiments and refinements of the described vehicle transmissions.

SUMMARY OF THE INVENTION

A first embodiment of a vehicle transmission according to the invention with continuously variable transmission ratio contains a CVT variator with two variator shafts, an input shaft that can optionally be brought into rotational engagement with one or the other of the variator shafts, and an output shaft that can optionally be brought into rotational engagement with one or the other of the variator shafts, such that two forward driving ranges with opposite torque transmission directions of the CVT variator are present, whose transmission ratio ranges are constantly contiguous with each other.

In a preferred embodiment, a reverse gear that is in rotational engagement through an intermediate gear with a first variator shaft and can be coupled with the input shaft in a rotationally fixed engagement through a reverse clutch, and two forward gears, are mounted on the input shaft, which can be coupled with the first variator shaft through a clutch for each, and mounted on the output shaft are two gears, one of which is in rotational engagement with the first variator shaft and the other with the second variator shaft, and which can each be coupled with one of the variator shafts in a rotationally fixed engagement through a clutch for each.

The CVT variator can be a belt-driven conical-pulley variator, where in the forenamed version of the vehicle transmission the input shaft and the output shaft are advantageously situated coaxially on opposite sides of the variator between its conical disk pairs. That achieves a compact design of the vehicle transmission.

In another preferred embodiment of the vehicle transmission according to the invention, a first gear is situated on the input shaft, which first gear is in rotational engagement with a third gear which is connected to the first variator shaft in a rotationally fixed connection, and a second gear is situated on the input shaft which is in rotational engagement with the second variator shaft and with a fourth gear situated on the output shaft, where the first and second gears can be coupled with the input shaft in a rotationally fixed coupling through a clutch for each, and the third and fourth gears can be coupled with the output shaft in a rotationally fixed coupling through a clutch for each. Situated on the input shaft is a reverse gear which can be brought into rotational engagement with the input shaft through a reverse clutch, which reverse gear is rotationally engaged, through an intermediate gear, with a fifth gear which is connected to the first variator shaft in a rotationally fixed connection.

Preferably, in the forenamed version the output shaft is situated coaxially with the second variator shaft on one side of the variator, the input shaft projects through the variator, and the reverse gear is situated on the side of the variator facing away from the output shaft.

Another motor vehicle transmission according to the invention with continuously variable transmission ratio contains a CVT variator having a first and a second variator shaft, an input shaft that can be brought by means of a first clutch into rotationally fixed engagement with an intermediate shaft or by means of a second clutch into engagement with an intermediate gear mounted on the intermediate shaft. The intermediate gear is in rotationally fixed engagement with the first variator shaft, and the intermediate shaft is in rotationally fixed engagement with the second variator shaft. The transmission also contains a third clutch by means of which the intermediate gear can be coupled with an output gear in a rotationally fixed connection, a fourth clutch by means of which the output gear can be coupled with the intermediate shaft in a rotationally fixed connection, and a reverse clutch by means of which the output gear can be coupled with the second variator shaft in a rotationally fixed connection.

Another vehicle transmission that operates with power branching and having a continuously variable transmission ratio contains an input planetary gear unit connected to an input shaft. The input planetary gear unit is connected through a CVT variator provided with a first and a second variator shaft and at least one gear to an output shaft of an output planetary gear unit. The transmission includes at least one brake and clutches, the operation of which enables selection of the gear ranges R, N, Low, Med and High. The planet carrier of the input planetary gear arrangement is connected to the input shaft, and the sun wheel gear of the input planetary gear unit is connected to the first variator shaft in a rotationally fixed connection. The sun gear of the output planetary gear unit is connected to the second variator shaft in a rotationally fixed connection, and the ring gear is connected in a rotationally fixed connection to a ring gear shaft, which is connected in a rotationally fixed connection to a ring gear shaft gear that meshes via a reversing gear with a third variator shaft gear. A variator shaft gear carried by the first variator shaft meshes with a first reversing intermediate shaft gear, which meshes with the planet carrier teeth of the planet carrier of as the output planetary gear unit. The ring gear of the output planetary gear unit is connected to the output shaft. A second variator shaft gear carried by the first variator shaft meshes with a second reversing intermediate shaft gear, which meshes with a first output shaft gear, which is connected to the output shaft in a rotationally fixed connection. The second variator shaft gear is connectable through a first clutch to the first variator shaft, the planet carrier of the output planetary gear unit is connectable through a second clutch to the first variator shaft, the first variator shaft gear is connectable through a third clutch to the first variator shaft, and a first reversing intermediate shaft gear can be stopped with the brake.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
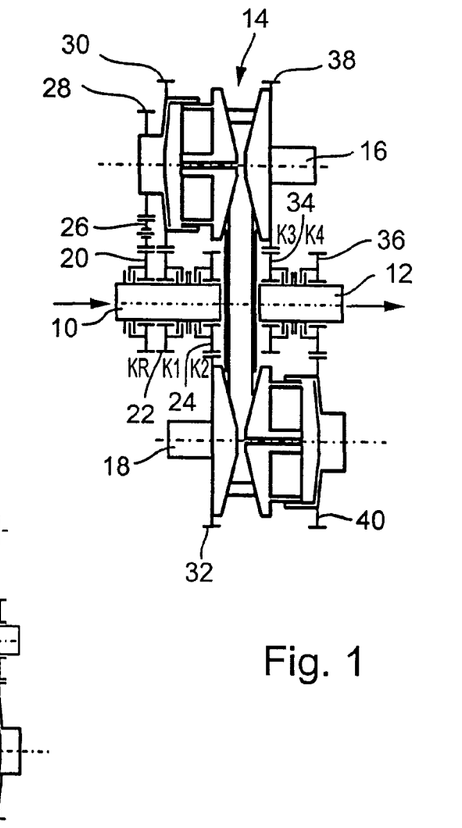
FIG. 1 is a sketch of the principle of a first version of a transmission according to an embodiment of the invention, with a matrix of the positions of clutches contained in the transmission in various gear ranges of the transmission, and sketches of the transmission in the various gear ranges.

According to FIG. 1, in particular the right part of FIG. 1, a transmission according to the invention has an input shaft 10 drivable by a combustion engine (not shown) and an output shaft 12 for driving a vehicle (not shown). Situated between the input shaft 10 and the output shaft 12 is a CVT variator 14 with two variator shafts 16 and 18. The transmission ratio between the variator shafts 16 and 18 can be changed continuously within the spread range of the variator. In the depicted example, the variator 14 is a belt-driven conical-pulley transmission of inherently known construction, with two pulleys that are encircled by an endless torque-transmitting means. The transmission ratio can be changed by changing the distance between the conical disks of the two pulleys in opposite directions. Each of the pulleys rotates synchronously with the corresponding variator shaft. According to FIG. 1, the input shaft 10 and the output shaft 12 are situated coaxially to each other on different sides of the variator 14 between the pulleys.

Mounted on the input side 10 are a reverse gear 20, a first forward gear 22 and a second forward gear 24. Each of the gears 20, 22, 24 can be brought into rotationally fixed engagement with the input shaft 10 by means of a corresponding clutch KR, K1 or K2.

Reverse gear 20 meshes through an intermediate gear 26 with a gear 28 which is connected to first variator shaft 16 in a rotationally fixed connection. First forward gear 22 meshes with another gear 30 which is connected to first variator shaft 16 in a rotationally fixed connection. Second gear 24 meshes with a gear 32 which is connected to first variator shaft 18 in a rotationally fixed connection.

Mounted on output shaft 12 are two gears 34 and 36, each of which can be coupled with output shaft 12 through a clutch K3 or K4, respectively. Gear 34 meshes with a gear 38, which is connected to first variator shaft 16 in a rotationally fixed connection. Gear 36 meshes with a gear 40, which is connected to second variator shaft 18 in a rotationally fixed connection.

The matrix at the upper left of FIG. 1 gives the positions of clutches KR, K1, K2, K3 and K4 for various gear ranges R, N, Low and High. An "X" means that the particular clutch is engaged. A "-" means a disengaged clutch.

In an extremely geared "Low" range, clutches K1 and K4 are engaged and the other clutches are disengaged. According to the sketch "Low" at the lower left of FIG. 1, in the "Low" range the torque flows from input shaft 10 through the engaged clutch K1 and the first forward gear 22 into the first variator shaft 16, from there by way of the endless torque-transmitting means into the second variator shaft 18, and from there by means of the engaged clutch K4 through gear 36 into output shaft 12.

In the longer-geared "High" range clutches K2 and K3 are engaged, so that the torque flows from the input shaft through second forward gear 24 into second variator shaft 18, from there into first variator shaft 16, and from the latter into output shaft 12 by means of the engaged clutch K3.

In reverse gear range, in which clutches KR and K4 are engaged, the torque flows from input shaft 10 through intermediate gear 26 into first variator shaft 16, from there to second variator shaft 18, and from there—because of the engaged K4—into output shaft 12.

Figure 2:
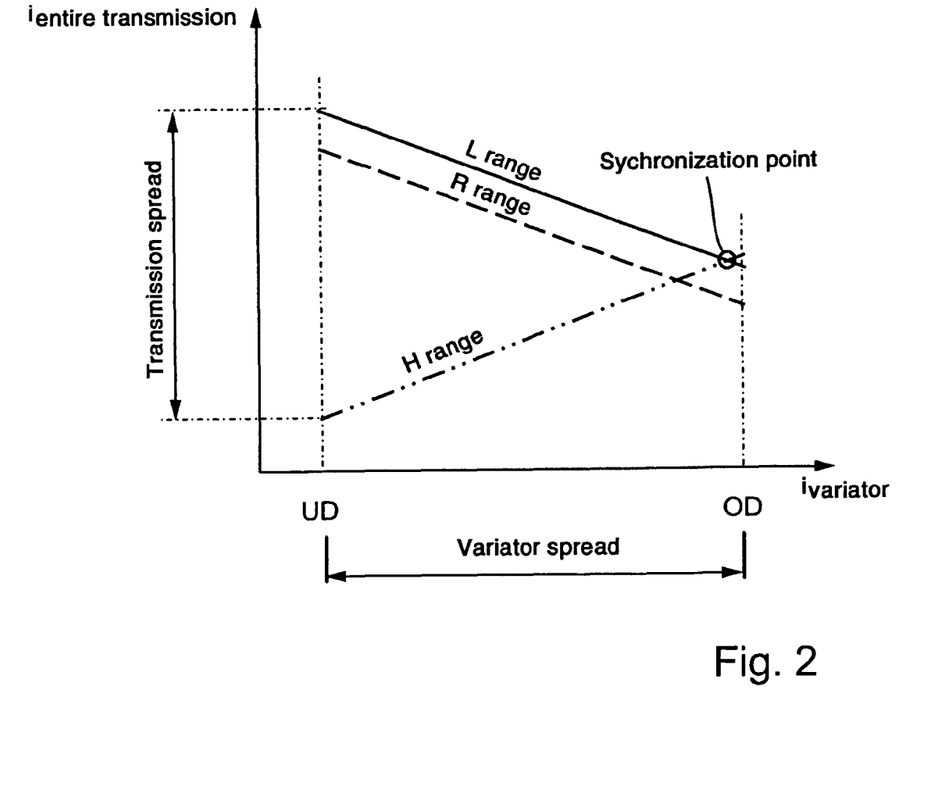
FIG. 2 is a graphical representation of the transmission ratio depending on the variator transmission ratio in the various gear ranges.

FIG. 2 shows the transmission ratio of the entire transmission "$i_{entire\ transmission}$" as a function of the transmission ratio of the variator "$i_{variator}$" for the various gear ranges. In the "Low" (L) range the variator spread is first traversed from UD (underdrive) to OD (overdrive), until clutches K1 and K4 can be disengaged and clutches K2 and K3 can be engaged at the synchronization point without changing the transmission ratio of the entire transmission. Next the gear range "High" (H) is traversed, by changing the transmission ratio of the variator in the direction from OD to UD. As can be seen, the variator spread is used twice, in order to give the transmission ratio of the entire transmission a sufficiently large spread. In the "Rev" (R) gear range, in which the clutches KR and K4 are engaged, the transmission ratio of the variator is changed from UD in the OD direction for an increase in speed.

Figure 3:
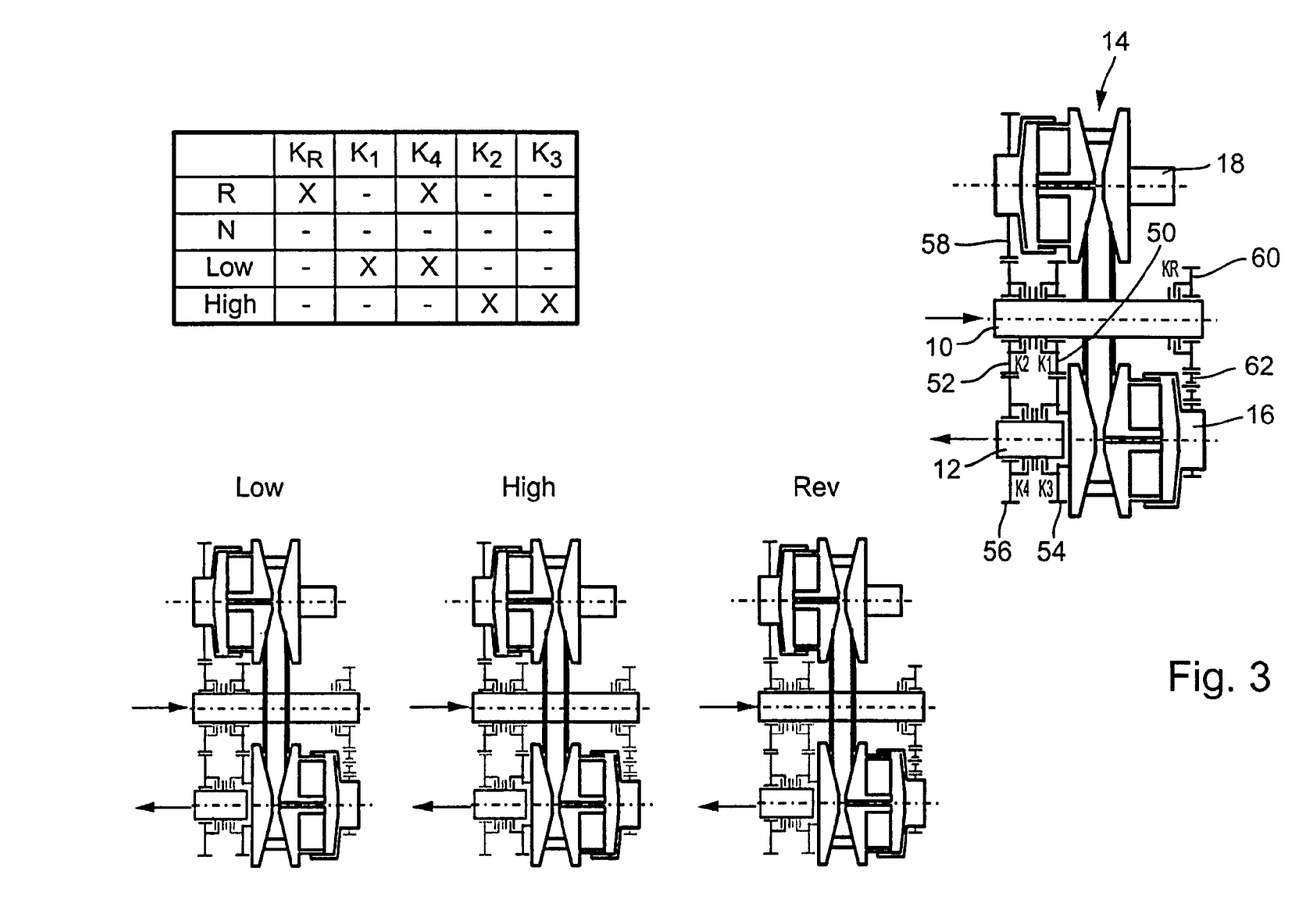
FIGS. 3, 5, and 7 are graphical representations similar to FIG. 1 of various versions of a transmission.
Figure 4:
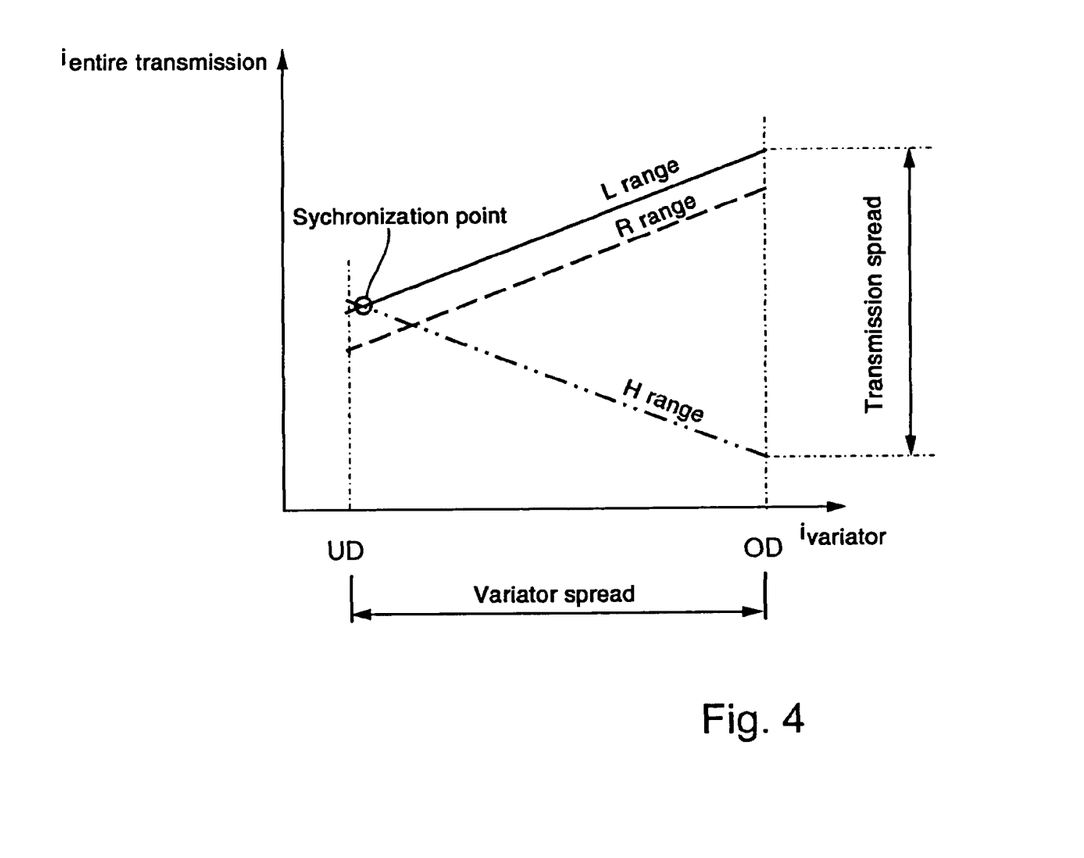
FIGS. 4, 6, and 8 are graphical representations similar to FIG. 2 of the transmissions according to FIGS. 3, 5, and 7.

On the basis of FIGS. 3 and 4, which correspond to FIGS. 1 and 2 with regard to their manner of representation, another version of a transmission according to the invention is next described, with reference labels the same as those in FIG. 1 indicating parts with the same function as those in FIG. 1.

In contrast to FIG. 1, in the design according to FIG. 3 input shaft 10 extends through CVT variator 14, and output shaft 12 is situated on one side of CVT variator 14 coaxially with the latter's first variator shaft 16.

Mounted on input shaft 10 are a first gear 50, and at a distance from it axially a second gear 52, with first gear 50 being rotationally engaged with a third gear 54, which is connected to first variator shaft 16, or to one conical disk of the corresponding conical disk pair, in a rotationally fixed connection.

Second gear 52 is rotationally engaged with a fourth gear 56, which is mounted on output shaft 12 and is also rotationally engaged with second variator shaft 18 through a gear 58 that is connected to second variator shaft 18 in a rotationally fixed connection.

First gear 50 can be coupled through a clutch K1 to input shaft 10 in a rotationally fixed connection. Second gear 52 can be coupled through a clutch K2 to input shaft 10 in a rotationally fixed connection. Similarly, third gear 54 and fourth gear 56 can be coupled through corresponding clutches K3 and K4 to output shaft 12.

On the end of input shaft 10 pointing away from gears 50 and 52 a reverse gear 60 is mounted, which is rotationally engaged through an intermediate gear 62 with first variator shaft 16, or with a gear that is connected to the latter in a rotationally fixed connection. Reverse gear 60 can be connected through a clutch KR to input shaft 10 in a rotationally fixed connection.

The matrix depicted at the upper left of FIG. 3 in turn shows the operating states of the clutches for the gear ranges of the transmission.

In Low gear range clutches K1 and K4 are engaged, so that torque is transmitted from input shaft 10 to first variator shaft 16, from there to second variator shaft 18, and from the latter, because of the engaged clutch K4, through gears 58, 52 and 56 to output shaft 12. In the High operating range clutches K2 and K3 are engaged, so that the torque is transmitted from output shaft 10 to first variator shaft 18, and from there through first variator shaft 16, because of the engaged clutch K3, to output shaft 12.

In reverse gear range Rev, clutches KR and K4 are engaged, so that torque is transmitted from input shaft 10 through intermediate gear 62 to first variator shaft 16, from there to second variator shaft 18, and from the latter, because of the engaged clutch K4, through gears 58, 52 and 56 to output shaft 12.

FIG. 4 shows the transmission ratio of the transmission $i_{entire\ transmission}$ as a function of the transmission ratio of the variator $i_{variator}$ for the various gear ranges. In contrast to the transmission according to FIG. 1, in the transmission according to FIG. 3 the Low range is traversed with a decreasing transmission ratio, as the variator transmission ratio changes from OD to UD. The High range is traversed as the variator transmission ratio changes from UD to OD.

Figure 5:
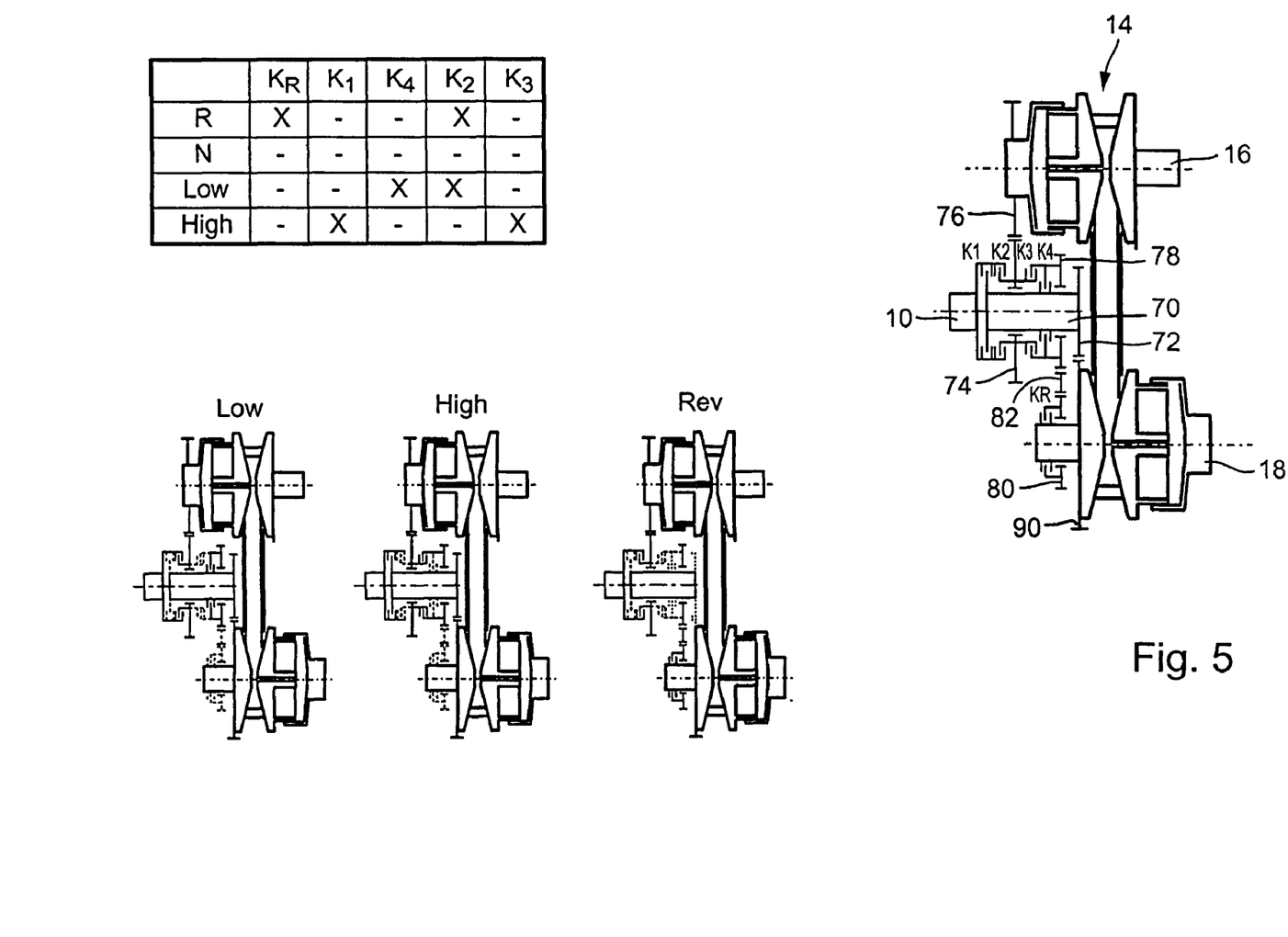

FIG. 5 shows a graphical representation similar to FIGS. 1 and 3 of a modified version of a transmission. The transmission contains a CVT variator 14 with a first variator shaft 16 and a second variator shaft 18. The transmission also contains an input shaft 10 and an intermediate shaft 70 situated coaxially with input shaft 10, to which intermediate shaft a connecting gear 72 is connected in a rotationally fixed connection, which meshes with teeth formed on a gear 90 that is connected to second variator shaft 18 in a rotationally fixed connection.

Input shaft 10 is connectable in a rotationally fixed connection through a first clutch K1 to intermediate shaft 70, or through a second clutch K2 to an intermediate gear 74 which is mounted on intermediate shaft 70. Intermediate gear 74 meshes with a gear 76, which is connected to first variator shaft 16 in a rotationally fixed connection.

Intermediate gear 74 is connected through a third clutch K3 to a take-off or output gear 78, which is mounted on intermediate shaft 70 and can be coupled through a fourth clutch K4 to intermediate shaft 70 in a rotationally fixed connection.

Mounted on second variator shaft 18 is a reverse gear 80, which is connectable through a reverse clutch KR to the second variator shaft 18 in a rotationally fixed connection, and which meshes with another gear 82, which, in turn, meshes with output gear 78.

The table at the upper left in FIG. 5 shows the positions of the named clutches in the various gear ranges of the transmission. X again designates the engaged position of the particular clutch.

The three graphical representations at the lower left in FIG. 5 show the torque flow of the transmission in the various gear ranges:

In the extremely geared "Low" range, in which clutches K2 and K4 are engaged, the drive torque acting on input shaft 10 is transmitted through intermediate gear 74 to first variator shaft 16, through the endless torque-transmitting means of the variator to second variator shaft 18, and from there to connecting gear 72 and to intermediate shaft 70, and from the latter to the take-off or output gear 78.

In the less extremely geared "High" range, in which clutches K1 and K3 are engaged, the drive torque acting through input shaft 10 is transmitted to intermediate shaft 70, from there through connecting gear 72 and gear 90 to second variator shaft 18, from there to first variator shaft 16, and from the latter through gear 76 and intermediate gear 74 and engaged clutch K3 to output gear 78.

In the reverse gear range Rev, in which clutches KR and K2 are engaged, the torque is transmitted from first input shaft 10 through intermediate gear gear 74 and gear 76 to first variator shaft 16, from the latter to second variator shaft 18, and from the latter through engaged clutch KR to output gear 78, from where the torque is transmitted into the rest of the vehicle power train.

Figure 6:
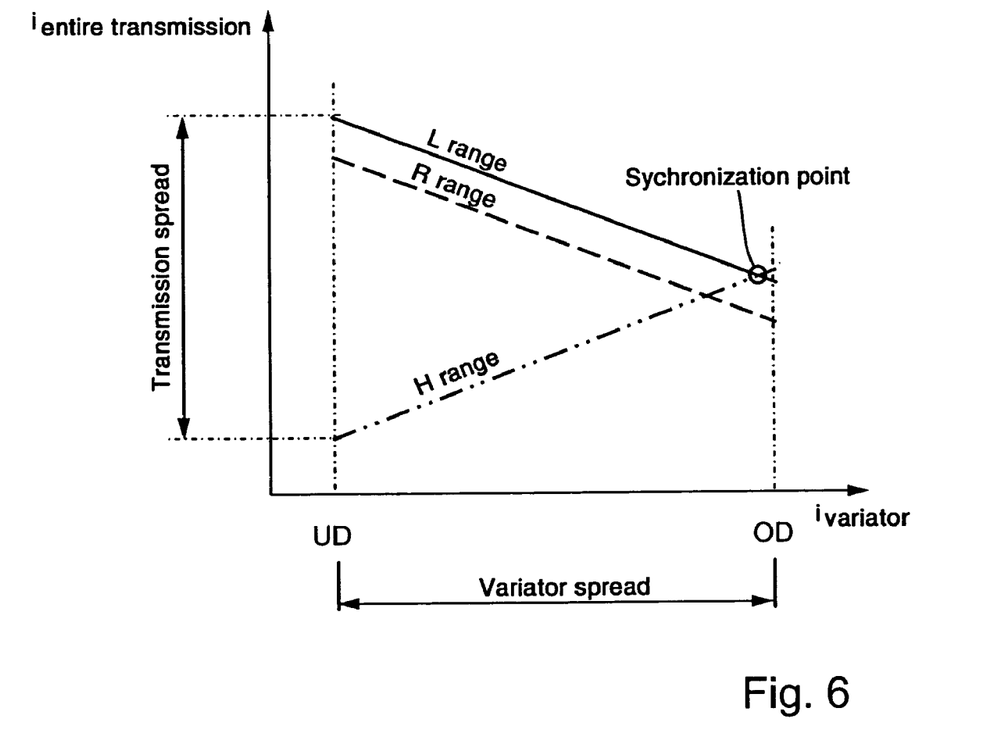

FIG. 6 shows how the possible variator spread is traversed twice to achieve a high transmission spread, by first changing the variator spread from UD to OD in the "Low" range, then disengaging clutches K2 and K4 and engaging clutches K1 and K3 at the synchronization point, so that the variator spread is traversed from OD to UD in the subsequent High range.

Figure 7:
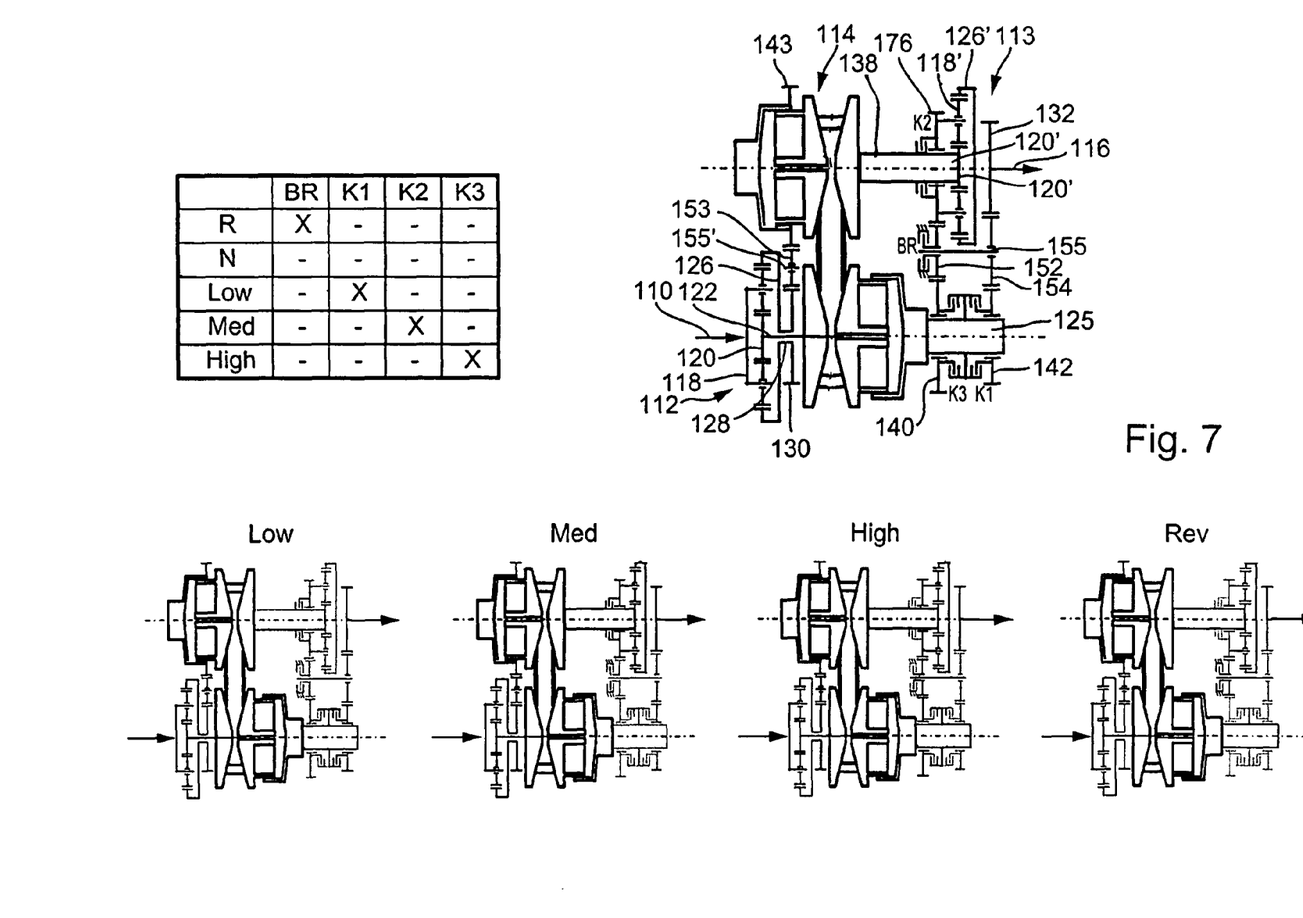

FIG. 7 shows another embodiment of an automatic vehicle transmission according to the invention with continuously variable transmission ratio, which operates with power branching and has three forward gear ranges.

An input shaft 110 is connected to the carrier of an input planetary gear unit 112. Input planetary gear unit 112 divides the power transmitted from the drive engine to input shaft 110 between two power branches. Ring gear 126 of input planetary gear unit 112 or sun gear 120 is connected to the CVT variator 114 through a gear pairing that is formed from a ring gear shaft gear 130 and a third variator shaft gear 143, and thereby to an output planetary gear unit 113. Variator shafts 125 and 138 of CVT variator 114 are connected through gear pairings to output shaft 116 and output planetary transmission 113.

These gear pairings are first formed of a first variator shaft gear 140, situated connectably on variator shaft 125, and a second variator shaft gear 142 in a rotationally fixed situation on variator shaft 125, where first variator shaft gear 140 is meshed with a first reversing intermediate shaft gear 152, and variator shaft gear 142 is engaged with a second reversing intermediate shaft gear 154, which are situated rotatably on an intermediate shaft 155. The torque is finally transmitted further through first reversing intermediate shaft gear 152 to planet carrier 176. After that the torque can be transmitted through a planet gear 118' to a ring gear 126, and is finally taken off at the output shaft 116. Depending on the setting positions of clutches K1 and K3, however, the torque can also be transmitted from second reversing intermediate shaft gear 154 to a first output shaft gear 132, which is connected to output shaft 116 in a rotationally fixed connection.

The individual shifts for the gear ranges are realized with the aid of claw clutches or multiplate clutches K1, K2, K3, and a brake BR.

The table at the upper left of FIG. 7 shows the position of brake BR and of clutches K1, K2, and K3 in the various gear ranges reverse (R), neutral (N), Low, Med, and High. Again, X means the engaged position of the brake or of the respective clutch.

The sketches at the bottom of FIG. 7 show the transmission of torque from the input shaft 110 to the output shaft 116.

In the extremely geared low driving range "Low" only clutch K1 is engaged, so that the torque is transmitted from variator shaft 125 through second variator shaft gear 142 and second reversing intermediate shaft gear 154 to first output shaft gear 132 or to output shaft 116.

In the longer-geared medium gear range "Med" only clutch K2 is engaged, so that the torque transmitted from input shaft 110 through input planetary gear unit 112 to the variator shafts is transmitted from variator shaft 138 through output planetary gear unit 113 to output shaft 116.

In the even longer-geared "High" range only clutch K3 is engaged, so that the torque is transmitted from variator shaft 125 through the engaged clutch K3 to first variator shaft gear 140, and from there through first reversing intermediate shaft gear 152 to planet carrier 176 of output planetary gear unit 113, whose ring gear 126' is connected to output shaft 116 in a rotationally fixed connection.

In the reverse gear range Rev only the brake BR is engaged, which brakes first reversing intermediate shaft gear 152 to a stop, so that the torque is transmitted from variator shaft 138 through output planetary gear unit 113 to output shaft 116 when planet carrier 176 is standing still.

Figure 8:
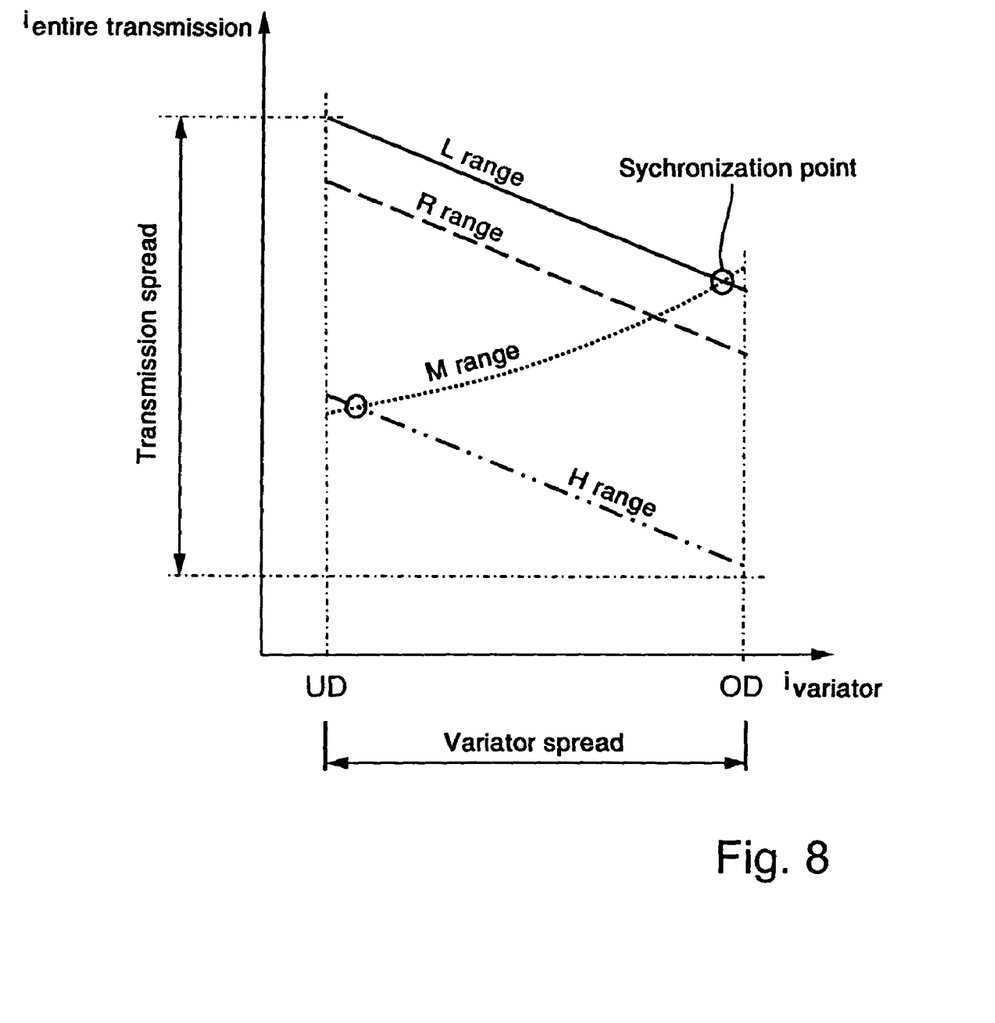

As can be seen from FIG. 8, the spread of variator 114 is used three times when traversing the three ranges Low, Med, and High, with a shift being made at a synchronization point in the OD range from the Low range to the Med range, and a shift from the Med range to the High range at a synchronization point in the UD range.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A vehicle transmission having a continuously variable transmission ratio, said transmission comprising:
   a CVT variator having first and second variator shafts,
   an input shaft rotatably engageable with a selected one of the variator shafts, and
   an output shaft rotatably engageable with a selected one of the variator shafts so that two forward gear ranges with opposite torque transmission directions of the CVT variator are provided, wherein transmission ratio ranges of the variator are constantly contiguous with each other, wherein there are mounted on the input shaft a reverse gear which is rotationally meshed with the first variator shaft through an intermediate gear and which can be coupled in a rotationally fixed connection with the input shaft through a reverse clutch and two forward gears which can be coupled in a rotationally fixed connection with the first variator shaft through a respective forward gear clutch; and
   two output shaft gears mounted on the output shaft, one of which output shaft gears is rotationally engaged with the first variator shaft and the other output shaft gear is rotationally engaged with the second variator shaft, and which output shaft gears can each be coupled with a respective one of the variator shafts in a rotationally fixed connection through a respective output shaft gear clutch.

2. A vehicle transmission according to claim 1, wherein the CVT variator is a belt-driven conical-pulley variator, and the input shaft and the output shaft are coaxially situated on opposite sides of the CVT variator between its conical disk pairs of the CVT variator.

3. A vehicle transmission having a continuously variable transmission ratio, said transmission comprising:
   a CVT variator having first and second variator shafts,
   an input shaft rotatably engageable with a selected one of the variator shafts, and
   an output shaft rotatably engageable with a selected one of the variator shafts so that two forward gear ranges with opposite torque transmission directions of the CVT variator are provided, wherein transmission ratio ranges of the variator are constantly contiguous with each other,
   a first gear carried on the input shaft is rotationally meshed with a third gear that is connected to the first variator shaft in a rotationally fixed connection,
   a second gear carried on the input shaft and is rotationally meshed with the second variator shaft and with a fourth gear carried on the output shaft,
   wherein the first gear and the second gear are couplable with the input shaft in a rotationally fixed connection through respective first gear and second gear clutches, and the third gear and fourth gear can be coupled with the output shaft in a rotationally fixed connection through a respective third gear and fourth gear clutches, and
   a reverse gear is carried on the input shaft which reverse gear can be brought into rotational engagement with the input shaft through a reverse clutch, wherein the reverse gear is rotationally meshed through an intermediate gear with a fifth gear that is connected to the first variator shaft in a rotationally fixed connection.

4. A vehicle transmission according to claim 3, wherein the output shaft is situated on one side of the variator coaxially with the first variator shaft, the input shaft extends through the variator, and the reverse gear is situated on the side of the variator that faces away from the output shaft.

5. A vehicle transmission having a continuously variable transmission ratio, said transmission comprising: a CVT variator with a first and a second variator shaft, an input shaft which can be brought through a first clutch into rotationally fixed engagement with an intermediate shaft, and through a second clutch into rotationally fixed engagement with an intermediate gear mounted on the intermediate shaft, which intermediate gear is in rotationally fixed engagement with the first variator shaft, and which intermediate shaft is in rotationally fixed engagement with the second variator shaft,
   a third clutch by means of which the intermediate gear can be coupled with an output gear in a rotationally fixed connection,
   a fourth clutch by means of which the output gear can be coupled with the intermediate shaft in a rotationally fixed connection, and
   a reverse clutch by means of which the output gear can be coupled with the second variator shaft in a rotationally fixed connection.

6. A vehicle transmission having a continuously variable transmission ratio, said transmission comprising:
   an input planetary gear unit connected to an input shaft, which input planetary gear unit includes a planet carrier, planet gears, a sun gear, and a ring gear and is connected to an output shaft of an output planetary gear unit through a CVT variator provided with a first and a second variator shaft and through at least one gear pairing, wherein the output planetary gear unit includes a planet carrier, planet gears, a sun gear, and a ring gear, and
   at least three clutches and at least one brake, operation of which enables selection of the gear ranges R, N, Low, Med, and High, where
   the planet carrier of the input planetary gear unit is connected to the input shaft,
   the sun gear of the input planetary gear unit is connected to the first variator shaft in a rotationally fixed connection, and the sun gear of the output planetary gear unit is connected to the second variator shaft in a rotationally fixed connection,
   the ring gear of the input planetary gear unit is connected in a rotationally fixed connection to a ring gear shaft, which is connected in a rotationally fixed connection to a ring gear shaft gear, which is drivingly connected through a reversing gear with a third variator shaft gear that is nonrotatably mounted on the second variator shaft, a first variator shaft gear carried by the first variator shaft meshes with a first reversing intermediate shaft gear which meshes with planet carrier teeth of the planet carrier of the output planetary gear unit, wherein the ring gear of the second planetary gear unit is connected to the output shaft, a second variator shaft gear carried by the first variator shaft meshes with a second reversing intermediate shaft gear which meshes with a first output shaft gear, which is connected to the output shaft in a rotationally fixed connection, the second variator shaft gear can be coupled to the first variator shaft through a first clutch, the planet carrier of the output planetary gear unit is connectable to the second variator shaft through a second clutch, the first variator shaft gear can be coupled to the first variator shaft through a third clutch, and the first reversing intermediate shaft gear can be braked to a stop by a brake.

\* \* \* \* \*